Apr. 10, 1923.　　　　　　　　　　　　　　　　　　1,451,380
R. THUM
TOOTHPICK
Filed Mar. 5, 1922
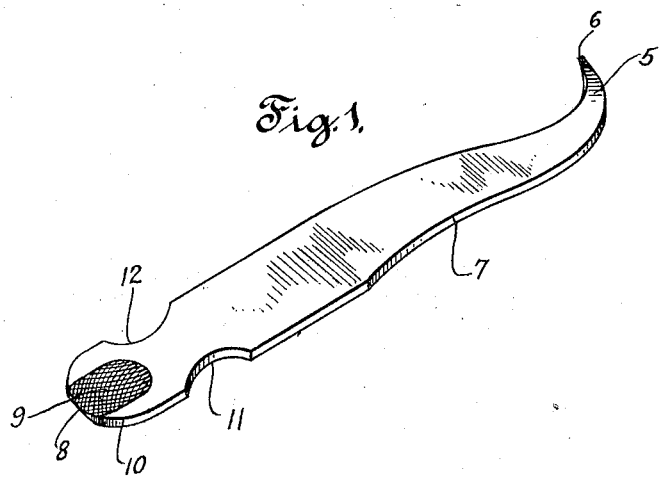
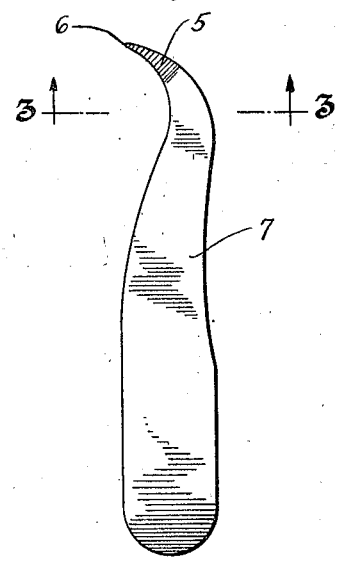
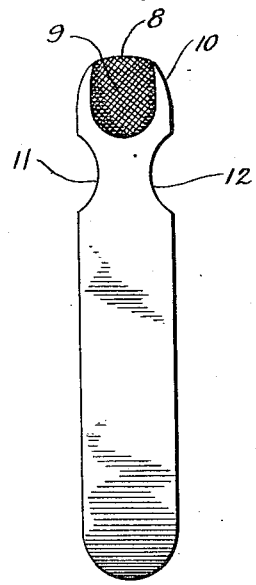
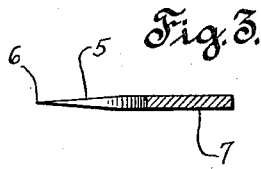
INVENTOR
Rudolf Thum
BY
ATTORNEY Patented Apr. 10, 1923.

1,451,380

UNITED STATES PATENT OFFICE.

RUDOLF THUM, OF BALDWIN, NEW YORK, ASSIGNOR TO THE WEVA COMPANY INCORPORATED, OF NEW YORK, N. Y., A CORPORATION OF NEW YORK.

TOOTHPICK.

Application filed March 5, 1922. Serial No. 558,624.

*To all whom it may concern:*

Be it known that I, RUDOLF THUM, a citizen of the United States, and resident of the town of Baldwin, county of Nassau, State of New York, have invented certain new and useful Improvements in Toothpicks, of which the following is the specification.

The device, the subject of this invention, while termed a tooth pick, may be utilized for all of the purposes for which an ordinary tooth pick is used, but it has possibilities and uses far beyond the ordinary wood or quill tooth pick and becomes in its complete use an instrument of oral surgery.

My tooth pick is preferably formed of a resilient material that will not harm the enamel on the teeth and has as its special objects, the production of a device especially useful in cleaning the teeth and retaining the gums in healthy condition, for that reason I provide means for cleaning the cavities from the inside of the teeth and means for massaging the gums and cleaning the neck of the teeth or the junction of teeth and gums.

The following is what I consider the best means of carrying out this invention and the accompanying drawing should be referred to for a complete understanding of the specification.

In the drawing:—

Fig. 1, is a perspective view of my device.
Fig. 2, a side elevation of a part removed.
Fig. 3, a sectional view on the line 3—3 of Fig. 2 and viewed in the direction of the arrows.
Fig. 4, a side elevation or plan view of another part.

Similar reference numerals indicate like parts in all the figures where they appear.

While my device may be made of any suitable material, I prefer that it be constructed of celluloid, bakelite, hard rubber or some similar material which will provide a certain degree of resiliency and yet sufficient strength and rigidity to allow the device to function properly.

My device is made from a flat piece of material and at one end, I produce a hook as shown at 5, the extreme point 6 of which is somewhat sharpened as shown in Fig. 4.

It will be noted that the body of the device is tapered for a certain portion of its length and toward the hooked end.

Adjacent to the hooked end, I produce a concavity 7, for a purpose that shall appear later and at the other extreme end, a second concavity or depressed portion is formed as shown at 8 and I prefer that the surface of this depressed portion be knurled or roughened as indicated at 9. The end 10 opposite the hook 5 is rounded and adjacent the rounded end I produce rather deep indents 11 and 12.

In the use of my device, the sharpened end 6 may be employed as an ordinary tooth pick between the teeth and from the outer side thereof, the sharpened end readily passing into the spaces between the teeth and thoroughly cleansing them regardless of how far or near the teeth are spaced from each other.

The sharpened end may also be used for removing particles from the inner side of the teeth or spaces, the hook making this operation possible and the concavity 7 increasing the range of operation as the upper teeth and lip will enter into and their projection be compensated for by the concavity 7.

The neck of the teeth may be cleaned and the gums massaged by the knurled depressed portion 8 and this portion may be used for administering a pyorrhicide, the indents 11 and 12 making it possible to work well around the gums. It will be seen then that my device, while it may be used as a tooth pick is really intended as an adjunct to a tooth brush.

Parts may be used without the whole and in Figs. 2 and 3, I show each end of the device as a separate unit and while other modifications may be made within the scope of the appended claims, I prefer the whole as shown and described.

Having carefully and fully described my invention, what I claim and desire to obtain is:—

1. A tooth pick comprising a flat body member, provided with a plurality of indents, a hook formed adjacent one indent and a rounded and depressed portion formed adjacent the other indents, said indents being arranged for the reception of the opposed lips and teeth.

2. A tooth pick comprising a flat body member formed of resilient material and provided with a plurality of indents, a sharpened hook at one end of said body member and adjacent one indent and a knurled depression at the other end of said body member and adjacent other indents, the last mentioned end being rounded.

Signed at the city, county and State of New York, this 30 day of Apr., 1922.

RUDOLF THUM.